June 17, 1958   R. H. OCHSNER   2,839,087
ATTACHMENT FOR USE IN PRESSURE GAUGES
Filed June 7, 1956
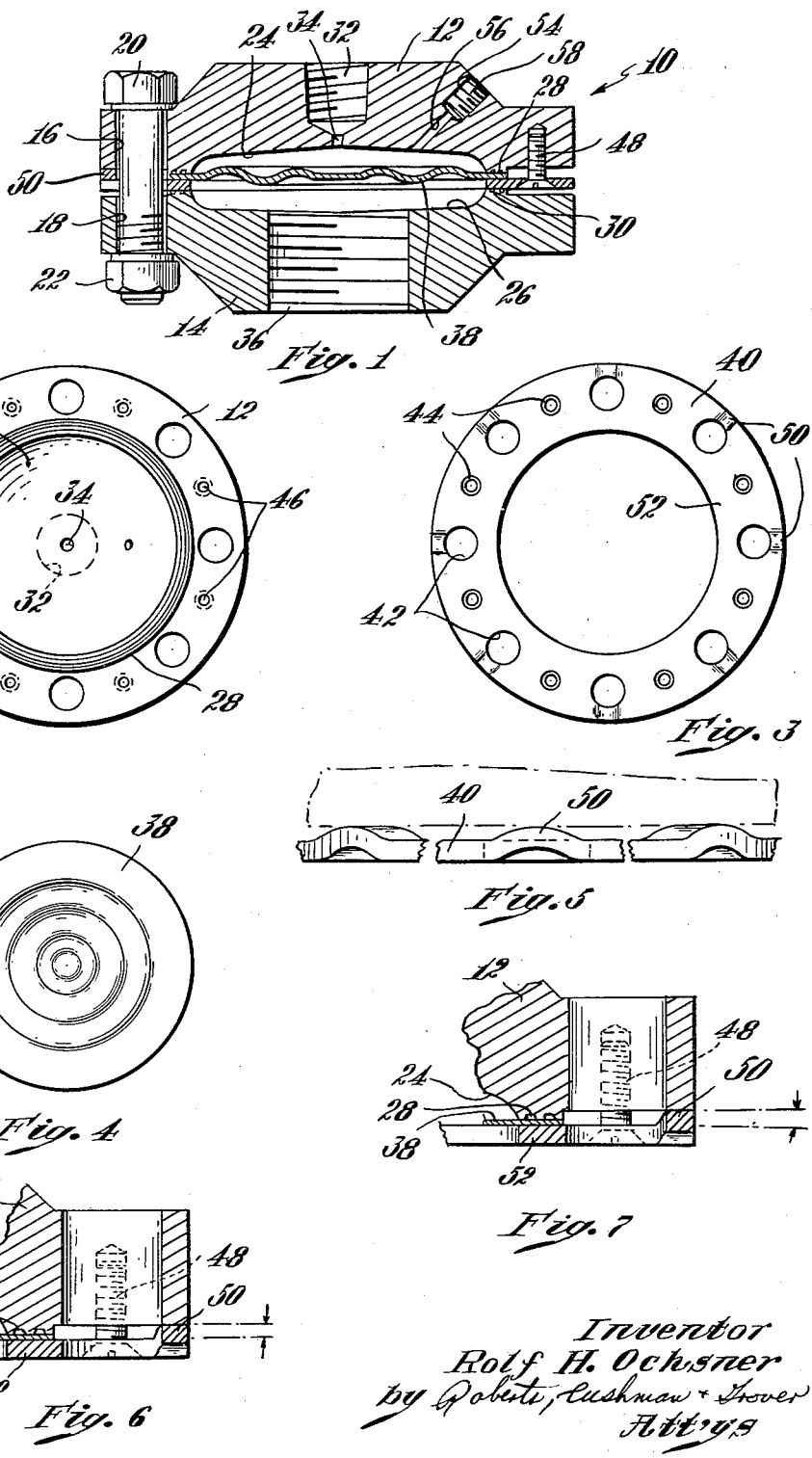
Inventor
Rolf H. Ochsner
by Roberts, Cushman & Grover
Att'ys

United States Patent Office 2,839,087
Patented June 17, 1958

2,839,087
ATTACHMENT FOR USE IN PRESSURE GAUGES

Rolf H. Ochsner, Trumbull, Conn., assignor to Manning, Maxwell & Moore, Incorporated, Stratford, Conn., a corporation of New Jersey Application June 7, 1956, Serial No. 589,967

6 Claims. (Cl. 137—791)

This invention relates to pressure gauges and more especially to a device for use in transmitting fluid pressure changes to pressure gauges without direct contact of the fluid with the pressure responsive parts of the gauge.

An object of this invention is to provide a pressure transmitting device for interposition between a source of pressure and the gauge itself so as to isolate the instrument from the pressure fluid thus to prevent access of pressure fluids to the instrument which are corrosive, subject to freezing, or would otherwise be destructive of the sensitive parts of the instrument. Another object is to provide a device which is particularly suitable for use with a Bourdon-type gauge to prevent access of viscous fluid to the Bourdon tube which would clog it up or with a Bourdon tube which cannot satisfactorily be made of a metal which has the necessary resistance to the chemical fluid being measured. Another object is to provide a device which will provide a seal between the fluid being measured and the pressure transmitting fluid within the instrument so that there is no chance of intermixing of the two by osmosis or leakage even at high pressures. Another object is to provide a device in which the separation of the fluid being measured from the transmitting fluid is effected by a diaphragm and in which a seal may be maintained at the instrument side of the diaphragm to prevent loss of fluid from the instrument and its connections to the device during disassembly of the parts for cleaning. Another object is to provide a fluid pressure transmitter which has a minimum number of parts and hence a minimum number of joints which may leak or be tampered with. Another object is to provide a device with a reduced number of parts to effect economy in hard-to-obtain and hard-to-machine parts and to design an instrument in which the parts are of substantially identical structure so as to be capable of manufacture in part at least in duplication, thereby reducing the manufacturing cost. Still other objects are to provide a device which is compact, easy to assemble and durable.

The device comprises two parts, each part containing bolt holes for receiving bolts by which they may be bolted together with a diaphragm between them. The adjacent sides of the parts have recesses therein so that on juxtaposition the recesses form closed chambers, one at each side of the diaphragm. Each part has also a threaded port, one at one side of the diaphragm being adapted to be connected to the gauge and the other at the opposite side of the diaphragm being adapted to be connected to the pressure fluid being measured.

In accordance with the invention an annulus is arranged to be bolted to the part which is connected to the gauge against the outside of the diaphragm so as to bind the diaphragm against the part independently of the other part thus to make it possible to assemble and disassemble the device for cleaning without loss of the transmitter fluid in the instrument. To improve the seal there is means along the outer edge of the annulus which holds it elevated so that when the annulus is drawn down against the subjacent diaphragm and part by the attaching bolts the annulus cants at its inner edge, biting into the gasket and hence insuring continuous circular contact of the diaphragm with the part. Preferably the parts have raised shoulders bounding the recesses between which the edge of the diaphragm is sandwiched and the annulus has at its outer edge that is, beyond the bolt circle a plurality of convex protrusions which have a vertical thickness greater than the thickness of the shoulder so that when the annulus is bolted thereto it will slope or pitch from its outer edge toward its inner edge and so that its inner edge has substantially line contact with the diaphragm.

The invention will now be described in greater detail with reference to the accompanying drawings wherein:

Fig. 1 is a vertical diametrical section through the transmitter;

Fig. 2 is a plan view of the upper half of the transmitter as seen from the inner side with the gasket and annulus removed;

Fig. 3 is a plan view of the annulus;

Fig. 4 is a plan view of the diaphragm;

Fig. 5 is an enlarged fragmentary elevation of an edge of the annulus showing the shape of the protrusions;

Fig. 6 is an enlarged fragmentary section showing the annulus engaged with the diaphragm before the attaching bolts are drawn up tight; and Fig. 7 is a corresponding view with the bolt tightened so as to cant the inner edge of the annulus.

Referring to the drawings, the transmitter 10 comprises substantially circular parts 12 and 14 provided with a plurality of uniformly distributed, peripherally arranged registering holes 16 and 18 for receiving bolts 20 and nuts 22 for bolting the parts in face to face relation. Each part has in it a concave recess 24 and 26 respectively, bounded by a raised annular shoulder 28 and 30 respectively. The parts 12 and 14 as thus far described are of substantially identical construction and hence may be made in duplicate thereby providing for economy in manufacture. These parts may be cast or forged to shape or machined and filed in jigs designed for this purpose.

The upper part 12 (Fig. 2) which is designed to be connected to the pressure gauge, for example, a Bourdon tube gauge, has in it a threaded hole 32, the inner or bottom end of which is connected to the internal cavity 24 by a constricted port 34. The lower part 14 which is adapted to be connected to the source of pressure is provided with a larger threaded opening 36 which is in communication with its internal recess 26.

As previously stated the parts are adapted to be bolted face to face and, to prevent access of the pressure fluid being measured to the gauge, a diaphragm 38 (Figs. 1 and 4) is interposed between the two so that its peripheral edge is sandwiched between the shoulders 28 and 30, the latter preferably having their surfaces grooved in customary fashion to improve the seal. The respective recesses provide chambers, one at each side of the diaphragm. As will be seen (Figs. 1, 6 and 7), the shoulders 28 and 30 are elevated slightly from the surfaces radially outward therefrom so as to leave a gap between the parts.

When used with a Bourdon gauge the gauge and upper half 12 of the device are connected by a tube and then filled with a fluid which is harmless to the Bourdon tube. When chemical fluids are to be measured the entire system above the diaphragm including the Bourdon tube of the gauge may be evacuated and solid filled with a specially developed inert liquid having a low thermal expansion rate. The connections between the gauge and the device may be a capillary tube protected by armor and may vary in length from 10 feet up to 100 feet.

The diaphragm itself has a comparatively low spring rate with reference to the Bourdon tube and therefore is simply a seal which prevents the medium which is being measured from getting into the Bourdon tube. The diaphragm may be made of all sorts of metal or plastic suitable to stand a wide variety of corrosive substances. The diaphragm as illustrated is comprised of a thin metal sheet or an equivalent of such density as to prevent osmosis and is corrugated in concentric circles to permit a limited amount of flexing perpendicular to its surface.

The chamber at the lower side of the diaphragm is, of course, exposed to the fluid being measured and it is necessary to remove this lower part frequently to permit cleaning especially where the fluids being measured are of a viscous type which may eventually fill the chamber solidly.

In order to permit removal of the lower part for cleaning without loss of the pressure transmitting fluid at the gauge side of the diaphragm an annulus 40 (Fig. 3) is designed to be bolted to the part 12 against the peripheral edge of the diaphragm 38 so as to clamp the latter to the part 12 and hence to retain the fluid within the cavity 24 and gauge regardless of whether the part 14 is bolted to the part 12 or not.

The annulus has a plurality of holes 42 (Fig. 3) between its inner and outer edges which correspond in spacing with the bolt holes in the parts 12 and 14 so as to be in registration therewith when the parts are assembled and, in addition, a plurality of holes 44 which lie between the holes 42 and between its inner and outer edges, herein shown on the bolt circle. The part 12 is provided with a corresponding number of threaded holes 46 and the annulus is fastened to the part 12 by placing screws 48 in the holes 44 and screwing them into the holes 46 so as to squeeze the peripheral edge of the diaphragm between the annulus and the shoulder 28.

In order to make a positive seal between the diaphragm and the shoulder 28, the annulus 40 has at its outer edge that is, radially outward of its bolt circle (Fig. 3) a plurality of convex protrusions 50, herein shown as being produced by displacing the metal of the annulus upwardly, as shown in Fig. 5, so that there are a plurality of convex surfaces extending from the side of the annulus next to the part 12. As illustrated, the axes of the protrusions 50 lie on radii running through the centers of the bolt holes. These protrusions have a greater vertical depth than the shoulder 28; hence when the screws 48 are turned in tight they pull the inner edge 52 of the annulus downwardly against the shoulder 28 at an angle, as shown in Fig. 7. In other words, the protrusions 50 constitute a plurality of fulcrum points along the outer edge of the annulus about which the annulus is canted, as the bolts are screwed tight against it so that the sealing pressure is concentrated along the line of the lower corner at the inner edge of the annulus which bites firmly into the substance of the diaphragm and thus insures a complete circular contact. By this construction it is at once evident that a seal may be maintained between the diaphragm and the part 12 which is independent of the clamping of the part 14 thereto so that there is no possibility of loosing the fluid at the instrument side of the diaphragm when the part 14 is removed for purposes of cleaning. The cant or tilt of the annulus is very small and does not interfere with thep roper sealing of the part 14 against its opposite side when the latter is bolted to the part 12. With the parts firmly bolted together the device will withstand pressures up to 2000 pounds per square inch without failure.

The part 12 may be provided with a threaded opening 54 and passage 56 to permit introducing fluid to the instrument side of the transmitter or to permit bleeding out air if the fluid is introduced through the instrument itself.

In any event the threaded opening is adapted to be closed by a threaded plug 58. After the instrument has been filled with fluid at the instrument side and part 14 connected to the source of fluid to be measured the parts may be brought into juxtaposition and bolted firmly together by means of the bolt and nut 20 and 22.

While the annulus as herein illustrated shows the protrusions 50 as cylindrically convex and as placed opposite the bolt holes on radii passing through the centers of the bolt holes, it is within the scope of the invention to employ protrusions of spherical convexity or of any other shape useful for accomplishing the purpose desired and of locating them on radii passing through the centers of the bolt holes or on radii intermediate the centers of the bolt holes. In lieu of a plurality of protrusions a single circular rib located externally of the line of bolt holes may be employed.

That portion of the annulus inwardly of the bolt holes and the peripheral edge of the diaphragm are preferably coated with Teflon.

It should be understood that the present disclosure is for the purpose of illustration only and that this invention includes all modifications and equivalents which fall within the scope of the appended claims.

I claim:

1. In a device for transmitting pressure, a two-part housing, each part having a port, a diaphragm located between the parts dividing the housing into two chambers, one at each side of the diaphragm and one in communication with each port, and means clamping the parts together, an annulus located between the parts for fastening the diaphragm to one of the parts independently of the other part, said annulus having an inner edge of smaller diameter than the diameter of the diaphragm so that it overlaps the edge of the diaphragm, and an outer edge substantially coextensive with the parts, portions at least of the outer edge of said annulus having a greater effective thickness than the inner edge, said annulus having holes inwardly of said portions for receiving screw bolts, and said part to which the diaphragm is bolted having threaded holes with which the holes in the annulus are registrable, and screw bolts bolting the annulus to the one part, said screw bolts being turned down so as to cant the inner edge of the annulus against the subjacent diaphragm.

2. In a device for transmitting pressure from one side of a diaphragm to the other, a two-part housing, each part having a port, a diaphragm located between the parts dividing the housing into two chambers, one at each side of the diaphragm, and means clamping the parts together, an annulus located between the parts against one side of the diaphragm, and screw bolts for fastening the annulus and hence the diaphragm to one of the parts independently of the other, said annulus having an inner edge of smaller diameter than the diameter of the diaphragm so that it overlaps the edge of the diaphragm, and an outer edge substantially coextensive with the parts, portions at least of the outer edge of said annulus having a greater effective thickness than the inner edge, said annulus having bolt holes inwardly of said portions and said part to which the annulus is bolted having threaded holes for receiving the bolts, said screw bolts extending through the holes in the annulus into the threaded holes in the part and being turned down against the annulus so as to cant the inner edge of the annulus against the subjacent diaphragm.

3. In a device for transmitting pressure from one side of a diaphragm to the other, a two-part housing, each part having a recess in its inner surface, a port extending through said inner surface and bolt holes for receiving bolts to bolt the parts together with a diaphragm situated therebetween, a diaphragm between the parts dividing the housing into two chambers, one at each side of the diaphragm, and an annulus bolted on one of the parts with a continuous portion of it overlying the peripheral edge of the diaphragm so as to hold it clamped to said part independently of the bolting of the parts together, and means along that portion of the annulus located outwardly of the line of bolts holding said part elevated with respect to the part inwardly of the line of bolts so that the annulus is transversely tilted throughout its circumferential length.

4. In a device for transmitting pressure from one side of a diaphragm to the other, a two-part housing, each part having a recess, a raised annular bearing surface bounding its recess, and bolt holes outwardly of the bearing surface for receiving bolts to bolt the parts together, a diaphragm between the parts with its edge sandwiched between the bearing surfaces, said diaphragm dividing the housing into two chambers, one at each side of the diaphragm, an annulus located between the parts, said annulus having bolt holes registering with those in the parts, and means fastening the annulus to one of the parts independently of the other, said annulus having a radial width such that its inner edge overlies the bearing surface and its outer edge is substantially coextensive with the outer edge of the part, and a plurality of convex protrusions on the annulus located outwardly of the line of bolt holes, said protrusions having an effective vertical thickness which is greater than the vertical thickness of the bearing so that its inner edge is canted with respect to the outer edge.

5. In a device for transmitting pressure from one side of a diaphragm to the other, a two-part housing, each part having a recess therein, a raised annular bearing shoulder bounding it, said bearing shoulder having a plurality of concentric grooves in its surface, bolt holes outwardly of the bearing surface, bolts through said holes for bolting the parts together, a diaphragm clamped between the parts with its edge sandwiched between the bearing shoulders, an annulus having holes through it corresponding to the holes in the parts for reception of said bolts, and screw bolts fastening the annulus to one of the parts independently of the other part and the bolts bolting the parts together, said annulus and the one of the parts to which it is attached having secondary bolt holes between the primary bolt holes and between its inner and outer edges for receiving said screw bolts, said annulus having a radial width such that its inner edge overlies the bearing shoulder and the peripheral edge of the diaphragm, and its outer edge is coextensive with the part, and a plurality of convex protrusions on the annulus outside of the line of bolt holes, said protrusions having an effective vertical thickness greater than that of the shoulder so that the inner edge of the annulus is pitched downwardly against the diaphragm.

6. In a device for transmitting pressure from one side of a diaphragm to the other, a two-part housing, each part having a recess, a bearing surface surrounding the recess, and bolt holes for receiving bolts to bolt the parts together with a diaphragm therebetween, a diaphragm between the parts dividing the housing into two chambers, one at each side of the diaphragm, an annulus having bolt holes through it corresponding to the holes in the parts, and screw bolts fastening the annulus to one of the parts independently of the other to clamp the diaphragm between it and the part to which it is bolted so that the parts may be unbolted without releasing the diaphragm, said annulus having a radial width such that its inner edge overlaps the edge of the diaphragm and its outer edge is substantially coterminous with the parts, said annulus and the part to which it is bolted having secondary bolt holes located between the first-mentioned bolt holes and the inner and outer edges of the annulus for receiving the screw bolts, and a plurality of regularly spaced elevations on that portion of the annulus outwardly of the line of bolt holes and at the side next to the part to which it is bolted, pitching the entire inner edge against the diaphragm.

References Cited in the file of this patent
UNITED STATES PATENTS

| | | |
|---|---|---|
| 1,855,696 | Stover | Apr. 26, 1932 |
| 2,550,672 | Chyba | May 1, 1951 |
| 2,679,760 | Harland et al. | Jan. 1, 1954 |
| 2,741,205 | Paulton | Apr. 10, 1956 |